US011168646B2

(12) United States Patent
Nolin (10) Patent No.: US 11,168,646 B2
(45) Date of Patent: Nov. 9, 2021

(54) CARBURETOR HAVING INTEGRATED FILTER (71) Applicant: TTI (MACAO COMMERCIAL OFFSHORE) LIMITED, Macau (MO)

(72) Inventor: Eric Nolin, Anderson, SC (US)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 335 days.

(21) Appl. No.: 16/197,947

(22) Filed: Nov. 21, 2018

(65) Prior Publication Data

US 2019/0153982 A1 May 23, 2019

Related U.S. Application Data

(60) Provisional application No. 62/589,645, filed on Nov. 22, 2017.

(51) Int. Cl.
*F02M 19/06* (2006.01)
*B01D 29/56* (2006.01)
*B01D 35/00* (2006.01)
*F02M 19/025* (2006.01)

(52) U.S. Cl.
CPC ........... *F02M 19/066* (2013.01); *B01D 29/56* (2013.01); *B01D 35/005* (2013.01); *F02M 19/025* (2013.01)

(58) Field of Classification Search
CPC .... B01D 29/56; B01D 35/005; F02M 19/066; F02M 19/025
USPC ...................... 261/41.1, 41.2, 41.3
See application file for complete search history.

(56) References Cited

U.S. PATENT DOCUMENTS

| 1,412,487 | A | | 4/1922 | Peterson |
| 2,859,874 | A | | 11/1958 | Stearns |
| 2,988,345 | A | | 6/1961 | Kolbe et al. |
| 3,085,791 | A | | 4/1963 | Phillips |
| 3,201,096 | A | * | 8/1965 | Barr ..................... F02M 59/107 261/41.5 |
| 3,272,485 | A | * | 9/1966 | Newman ................ F02M 17/04 261/35 |
| 3,275,305 | A | | 9/1966 | Nutten |
| 3,275,306 | A | | 9/1966 | Phillips |
| 3,368,326 | A | | 2/1968 | Hervert |
| 3,454,265 | A | | 7/1969 | Phillips |

(Continued)

FOREIGN PATENT DOCUMENTS

| CA | 937119 A | 11/1973 |
| CA | 1076433 A | 4/1980 |

(Continued)

OTHER PUBLICATIONS

European Patent Office Search Report for Application No. 18207773.5 dated Feb. 25, 2019, 7 pages.

*Primary Examiner* — Charles S Bushey
(74) *Attorney, Agent, or Firm* — Michael Best & Friedrich LLP (57) ABSTRACT

A carburetor includes a body and a fuel bowl coupled to the body. A fuel bowl chamber is defined by the body and the fuel bowl. A fuel supply passageway fluidly couples a fuel supply inlet of the carburetor with the fuel bowl chamber. A fuel metering unit is coupled to the body of the carburetor. A first filter is disposed in one of the fuel supply passageway and the fuel bowl chamber, and a second filter is disposed in the fuel metering unit.

14 Claims, 8 Drawing Sheets

(56) References Cited

U.S. PATENT DOCUMENTS

| | | | |
|---|---|---|---|
| 3,485,483 A | | 12/1969 | Pohlman |
| 3,633,557 A | | 1/1972 | Tuckey et al. |
| 3,738,622 A | | 6/1973 | Tuckey |
| 3,743,253 A | | 7/1973 | Tuckey et al. |
| 4,104,994 A | | 8/1978 | Phillips |
| 5,133,905 A | * | 7/1992 | Woody ............... F02M 7/11 261/35 |
| 6,217,008 B1 | | 4/2001 | Abe et al. |
| 6,267,102 B1 | | 7/2001 | Parrullo et al. |
| 6,439,546 B1 | | 8/2002 | Galka |
| 6,446,939 B1 | | 9/2002 | Hoppe et al. |
| 6,715,737 B2 | | 4/2004 | Galka et al. |
| 8,573,567 B2 | * | 11/2013 | Jury ............... F02M 3/10 261/66 |
| 8,828,104 B2 | | 9/2014 | Boezi |
| 9,149,788 B2 | | 10/2015 | Boezi |
| 9,562,496 B1 | | 2/2017 | Roberts et al. |
| 2003/0047818 A1 | | 3/2003 | Nagata |
| 2005/0179146 A1 | | 8/2005 | Iwasa et al. |
| 2013/0249120 A1 | | 9/2013 | Burns |

FOREIGN PATENT DOCUMENTS

| | | | |
|---|---|---|---|
| EP | 2365204 A2 | | 9/2011 |
| GB | 2227524 A | * | 8/1990 |
| JP | S57193750 A | | 11/1982 |

* cited by examiner

CARBURETOR HAVING INTEGRATED FILTER

CROSS-REFERENCE TO RELATED APPLICATIONS

This application claims the benefit of U.S. Provisional Application No. 62/589,645 filed Nov. 22, 2017.

FIELD OF THE INVENTION

The present disclosure relates to carburetors, and more particularly to carburetors having an integrated filter to capture water.

SUMMARY

In one embodiment, the invention provides a carburetor including a body and a fuel bowl coupled to the body. A fuel bowl chamber is defined by the body and the fuel bowl. A fuel supply passageway fluidly couples a fuel supply inlet of the carburetor with the fuel bowl chamber. A fuel metering unit is coupled to the body of the carburetor. A first filter is disposed in one of the fuel supply passageway and the fuel bowl chamber, and a second filter is disposed in the fuel metering unit.

In another embodiment, the invention provides for a method of flowing fuel through a carburetor. The method includes a) flowing fuel through a fuel supply passageway from a fuel supply inlet of the carburetor to a fuel supply outlet; b) flowing fuel through a fuel bowl chamber from the fuel supply outlet to a fuel metering inlet; c) flowing fuel through a fuel metering passageway from the fuel metering inlet to a fuel metering outlet; d) passing fuel through a first filter within the carburetor as part of at least one of steps a through c; and e) passing fuel through a second filter within the carburetor at part of at least one of steps a through c.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

DETAILED DESCRIPTION

Small engines for use with, for example, outdoor power equipment (e.g., walk-behind mowers, etc.) typically utilize carburetors for supplying a mixture of air and fuel to the engine. Often times, the fuel used in small engines may include harmful contaminants that hurt the operation of the engine. In addition, unwanted water may be introduced to the fuel that degrades the fuel. Removing the water and harmful contaminants reduces corrosion and fuel degradation and may also assist in starting the engine.

Figure 1:
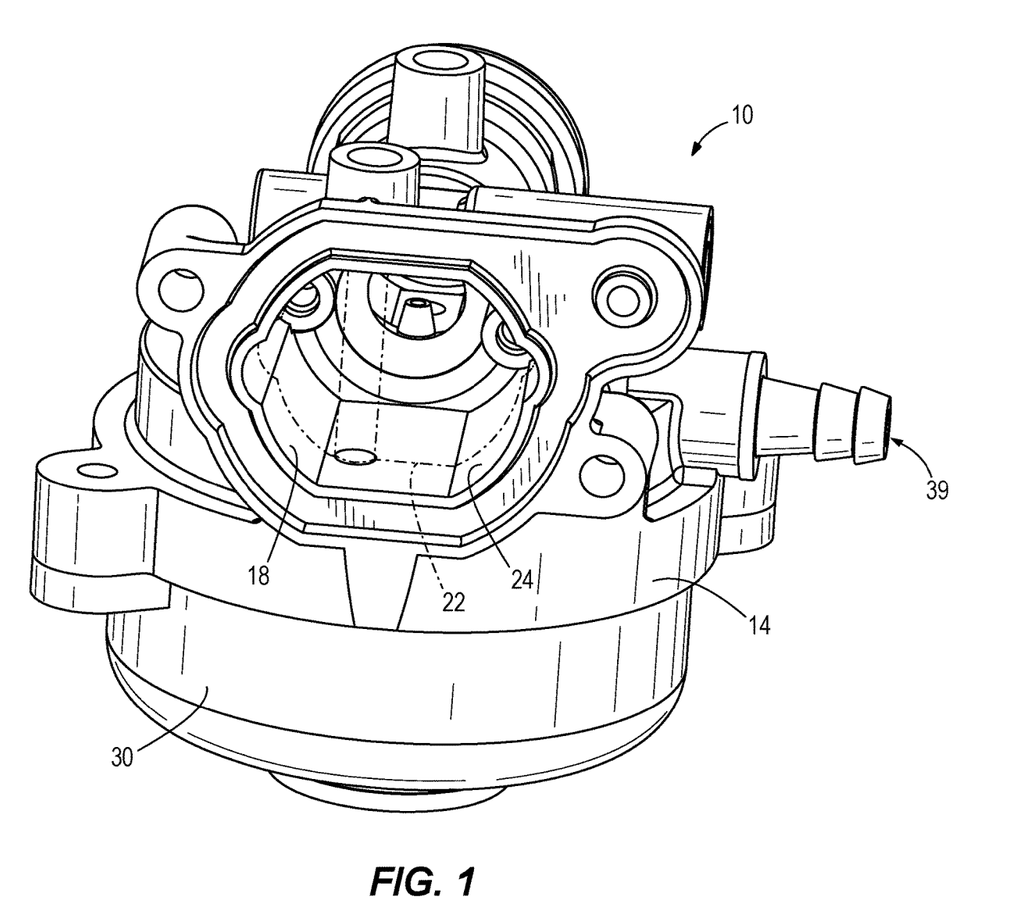
FIG. 1 is a perspective view of a first end of a carburetor according to one construction of the invention.
Figure 2:
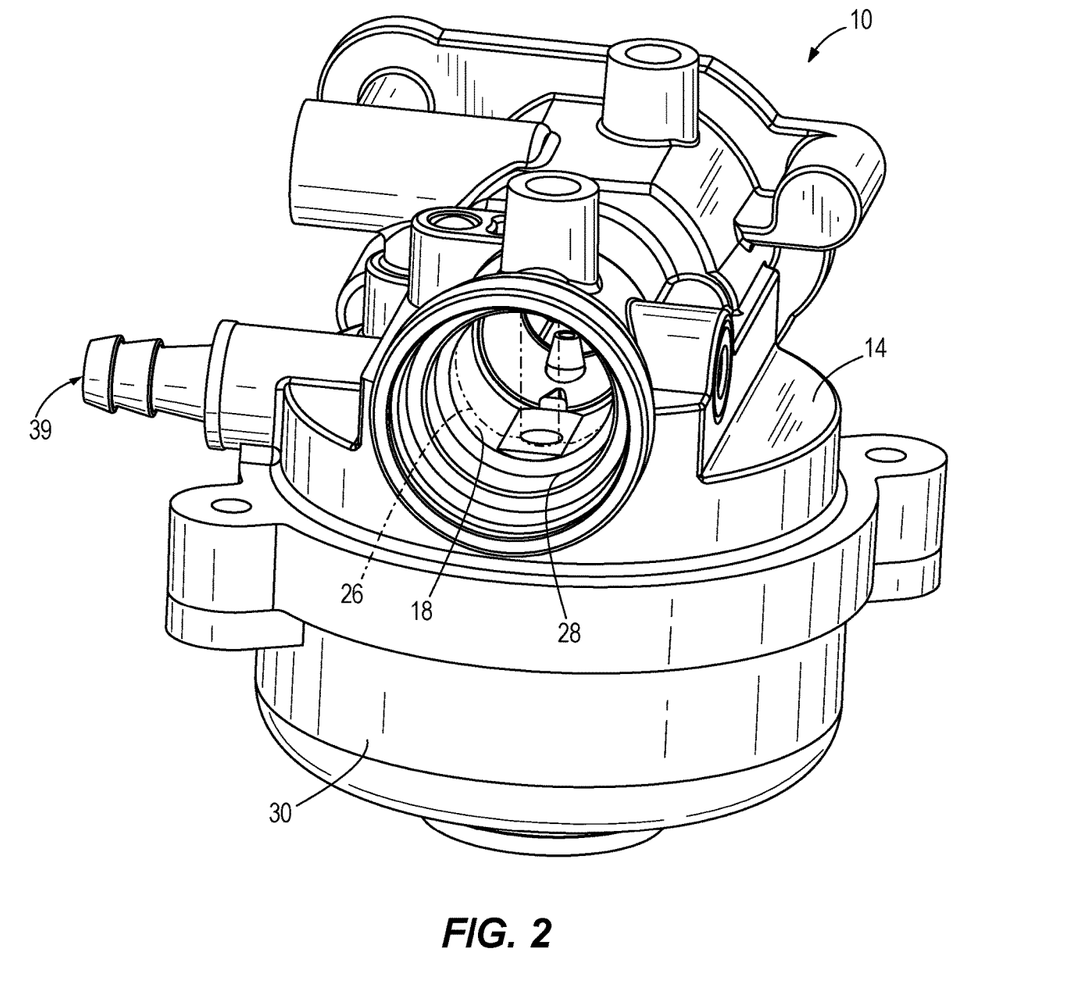
FIG. 2 is a perspective view of a second end of the carburetor of FIG. 1.

FIGS. 1 and 2 illustrate a first construction of a carburetor 10 configured for use with a small internal combustion engine. Such an engine may be utilized in outdoor power equipment (e.g., a lawnmower, snow thrower, etc.) or other types of engine-powered equipment (e.g., a generator). The carburetor 10 includes a body 14 defining an air/fuel passageway 18 in which a mixture of fuel and air is created for consumption by the engine. In some constructions, the body 14 is made of a single piece of plastic material using a molding process, with the exception of a few fittings or plugs coupled to the body 14 after it is molded. In some constructions, the fittings or plugs may be overmolded in the body 14. Alternatively, the body 14 may be made from metal as a single piece using a casting process. In further constructions, the carburetor 10 may be made from other materials. The carburetor 10 includes a choke valve 22 (FIG. 1) positioned in an upstream portion 24 of the air/fuel passageway 18, and a throttle valve 26 (FIG. 2) positioned in a downstream portion 28 of the air/fuel passageway 18. Movement of the choke valve 22 and throttle valve 26 may be controlled in a conventional manner using mechanical linkages (e.g., shafts, arms, cables, etc.). Alternatively, the choke valve 22 may be omitted.

Figure 3:
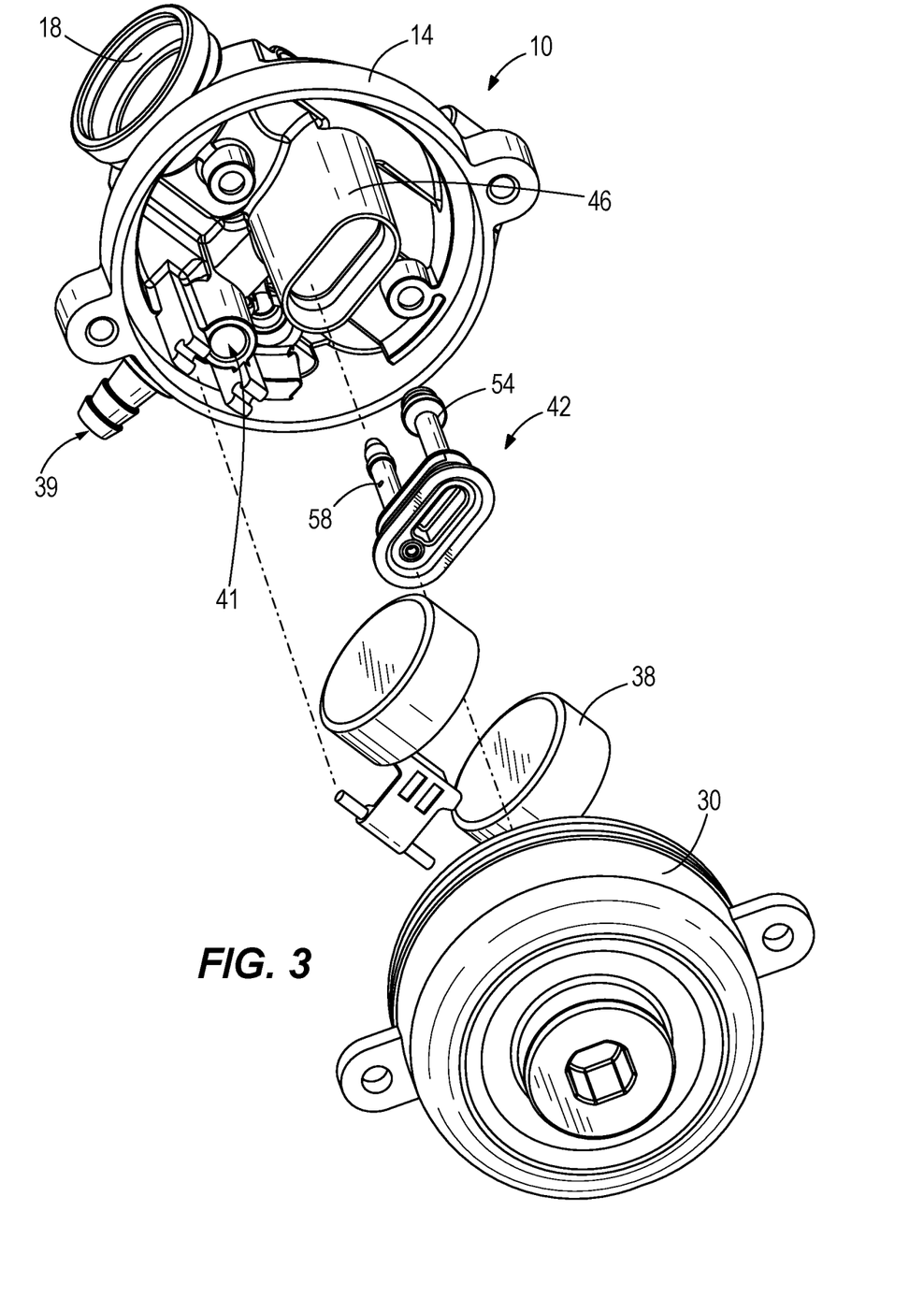
FIG. 3 is an exploded, bottom perspective view of the carburetor of FIG. 1.
Figure 4:
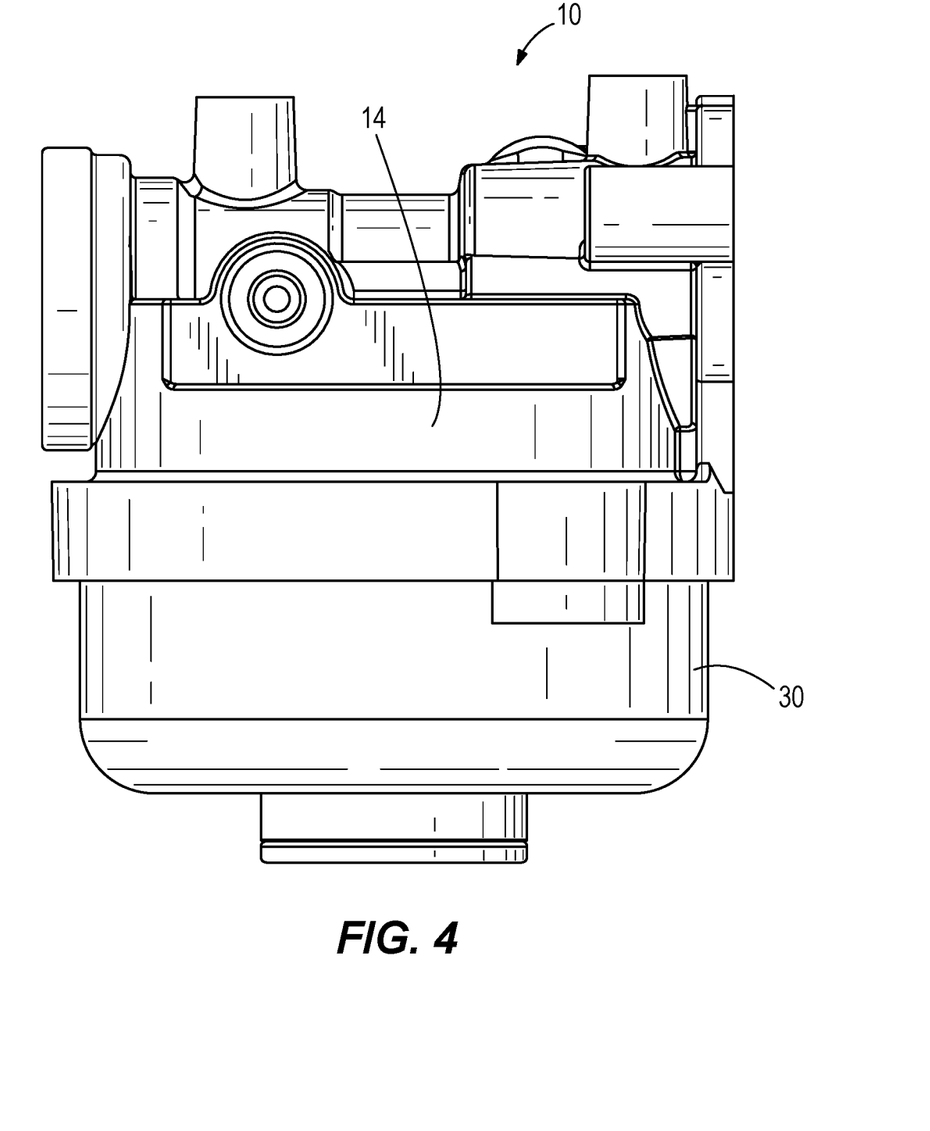
FIG. 4 is an assembled, side view of the carburetor of FIG. 1.
Figure 5:
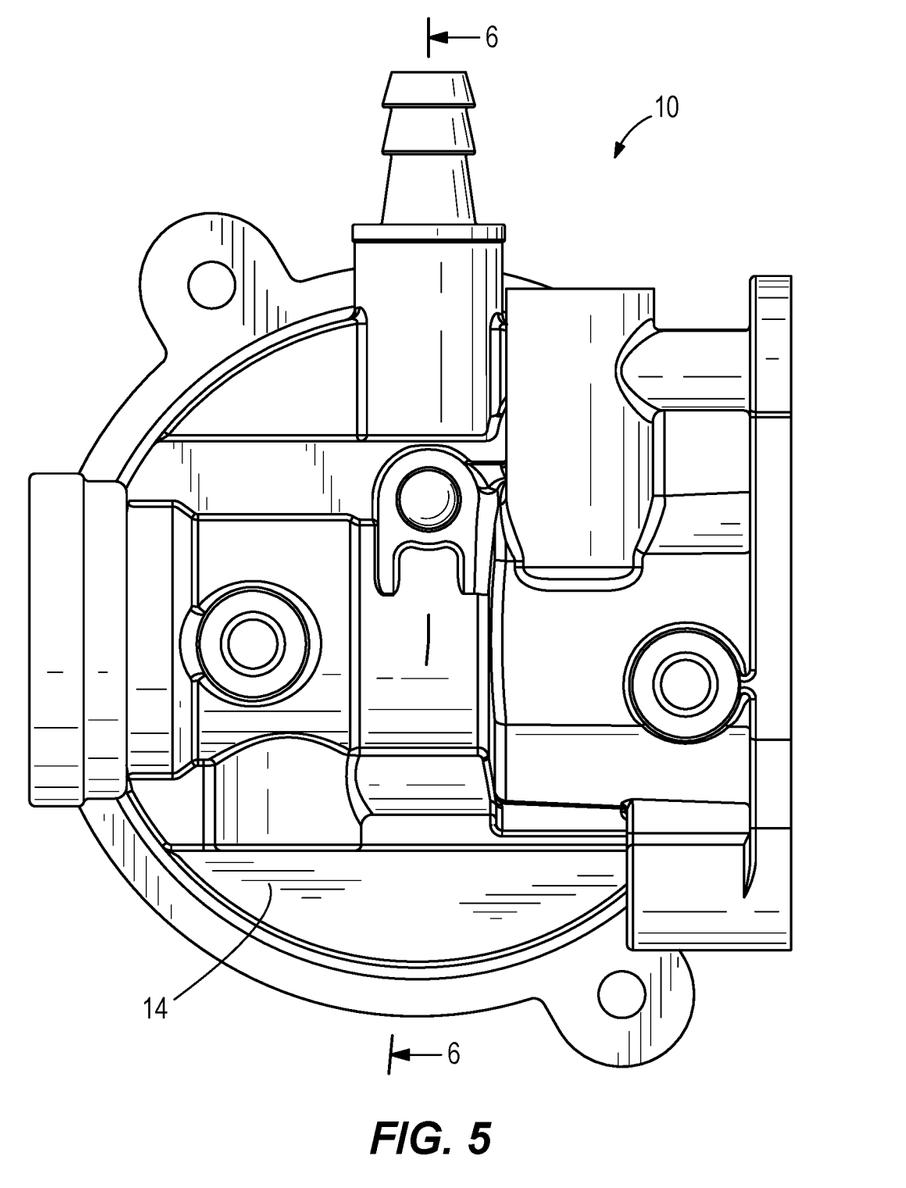
FIG. 5 is an assembled, top view of the carburetor of FIG. 1.
Figure 6A:
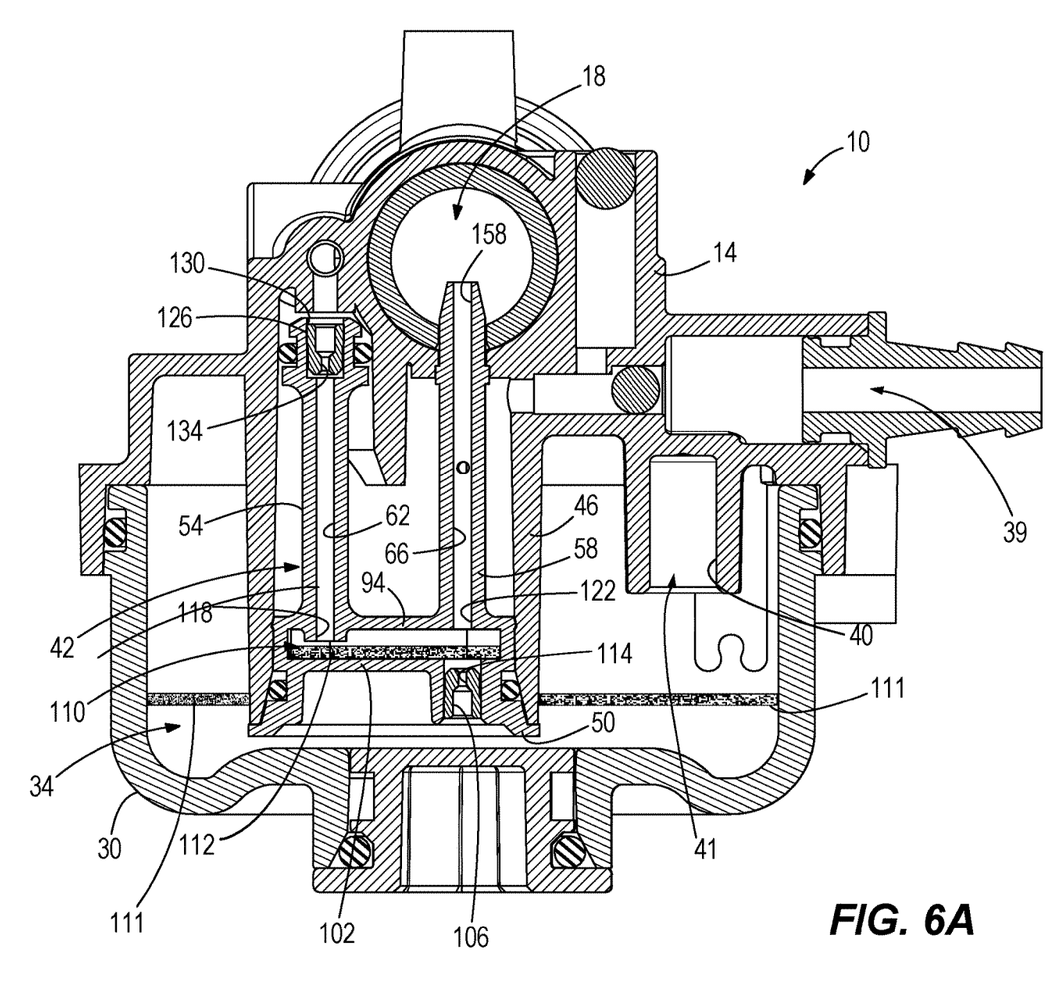
FIG. 6A is a cross-sectional view of the carburetor of FIG. 1 taken along line 6-6 in FIG. 5 with example placement locations of the first and second filters.
Figure 6B:
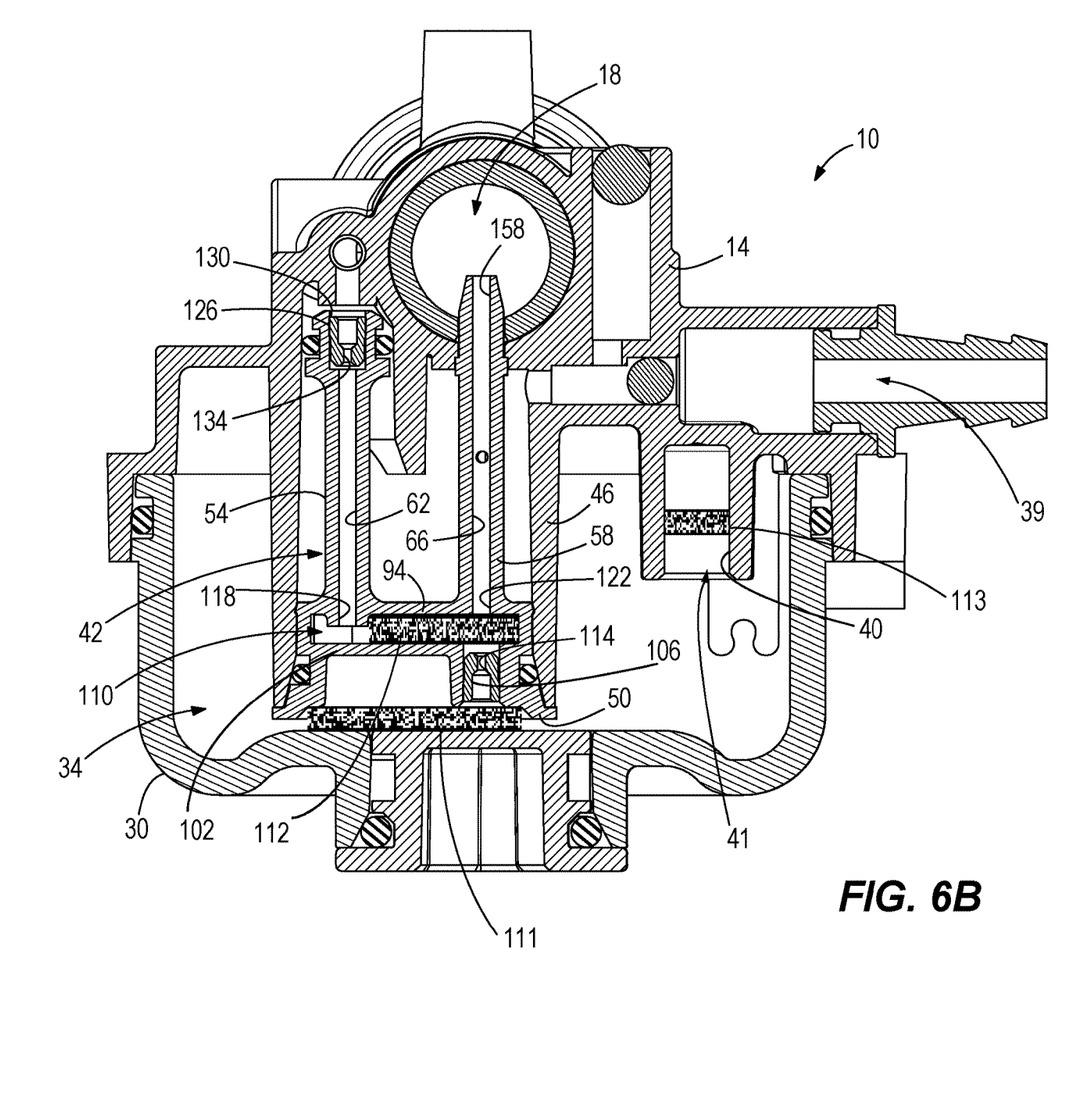
FIG. 6B is a cross-sectional view of the carburetor of FIG. 1 taken along line 6-6 in FIG. 5 with alternate example placement locations of the first and second filters with an additional third filter.

With reference to FIG. 3, the carburetor 10 also includes a fuel bowl 30 coupled to the body 14. The body 14 and the fuel bowl 30 define a fuel bowl chamber 34 in which fuel is stored (FIGS. 6A and 6B). The carburetor 10 also includes a float 38 pivotably coupled to the body 14. The float 38 is operable in a conventional manner in conjunction with a valve (not shown) to meter the amount of fuel introduced into the fuel bowl chamber 34. Alternatively, the carburetor 10 may include a different structure, besides the float 38, with which to meter the amount of fuel introduced into the fuel bowl chamber 34.

With reference to FIGS. 3, 6A and 6B, fuel is introduced into the carburetor 10 via a fuel line (not shown) coupled to the carburetor. The fuel enters the carburetor via a fuel supply inlet 39. The fuel supply inlet 39 can be defined in either the body 14 or the fuel bowl 30, but is illustrated as being defined in the body. The fuel, after entering through the fuel supply inlet 39, passes through a fuel supply passageway 40 and through a fuel supply outlet 41. As stated above with regard to the fuel supply inlet 39, both the fuel supply passageway 40 and the fuel supply outlet 41 can be defined in either the body 14 or the fuel bowl 30, but are illustrated as being defined in the body. Once the fuel has exited the fuel supply passageway 40 via the fuel supply outlet 41, the fuel then enters the fuel bowl chamber 34.

Returning now to FIG. 3, the carburetor 10 also includes a fuel metering unit 42. The fuel metering unit 42 is shown coupled to the body 14 in the illustrated construction. The fuel metering unit 42 includes at least one conduit. As shown in FIG. 3, the fuel metering unit 42 is positioned within a stem 46 on the body 14 and includes a low throttle conduit 54 extending from a base 50 and a high throttle conduit 58 extending from the base 50. In other constructions, there may be fewer or more conduits that deliver fuel from the fuel bowl chamber 34 to the air/fuel passageway 18.

With reference to FIGS. 6A and 6B, the low throttle conduit 54 defines therein a low throttle passageway (or second fuel metering passageway) 62 through which fuel flows from the fuel bowl chamber 34 to the air/fuel passageway 18 when the throttle valve 26 is oriented in a substantially closed position corresponding with an idle speed or low speed of the associated engine. The high throttle conduit 58 defines therein a high throttle passageway (or first fuel metering passageway) 66 through which fuel flows from the fuel bowl chamber 34 to the air/fuel passageway 18 when the throttle valve 26 is opened from its substantially closed position when the associated engine is operating at part throttle or high throttle.

With continued reference to FIGS. 6A and 6B, the stem 46 extends into the fuel bowl chamber 34, and the fuel metering unit 42 is supported within the interior of the stem 46. The base 50 of the fuel metering unit 42 includes a lower wall 102 spaced from an upper wall 94, and a jet 106 supported by the lower wall 102. The walls 94, 102 define therebetween a fuel reservoir 110, and the jet 106 includes an orifice (or fuel metering inlet) 114 sized to meter fuel flow from the fuel bowl chamber 34 to the fuel reservoir 110. In the illustrated construction of the carburetor 10, the jet 106 is configured as a separate and distinct component from the fuel metering unit 42 that is coupled to the base 50 (e.g., using a press-fit or an interference fit, using adhesives, by welding, etc.). Alternatively, the jet 106 may be omitted, and the lower wall 102 may include an orifice substantially identical to the orifice 114 in the jet 106 to meter fuel flow from the fuel bowl chamber 34 to the fuel reservoir 110.

Respective ends 118, 122 of the low throttle passageway 62 and the high throttle passageway 66 are in fluid communication with the fuel reservoir 110 to draw fuel directly from the fuel reservoir 110 during operation of the engine incorporating the carburetor 10. Another jet 126 is coupled to the low throttle conduit 54 at a location proximate an opposite end (or low throttle fuel metering outlet) 130 of the low throttle passageway 62. The jet 126 includes an orifice 134 sized to meter fuel flow that is discharged from or exiting the low throttle passageway 62. In the illustrated construction of the carburetor 10, the jet 126 is configured as a separate and distinct component from the fuel metering unit 42 and is coupled to the fuel metering unit 42 (e.g., using a press-fit or an interference fit, using adhesives, by welding, etc.). Alternatively, the jet 126 may be omitted, and the end 130 of the low throttle passageway 62 may be formed to include an orifice substantially identical to the orifice 134 in the jet 126 to meter fuel flow exiting the low throttle passageway 62.

As seen in FIGS. 6A and 6B, an end (or high throttle fuel metering outlet) 158 of the high throttle passageway 66 is disposed in a region of relatively low pressure in the air/fuel passageway 18, thereby allowing fuel to be drawn from the fuel reservoir 110, via the high throttle passageway 66, and into the air/fuel passageway 18 during part-throttle or high-throttle engine operation.

With reference now to FIG. 6A, a first filter 111 is shown disposed in the fuel bowl chamber 34. In the illustrated embodiment, the first filter 111 surrounds the stem 46. In this embodiment, the first filter 111 may be connected to one of the stem 46 and the fuel bowl 30 by press-fit or interference fit, using adhesives, and the like. A second filter 112 is shown disposed in the fuel reservoir 110 of the fuel metering unit 42. The second filter 112 can be of any appropriate size and shape to fit in the fuel reservoir 110 and may substantially occupy at least one dimension of the fuel reservoir. The illustrated construction of FIG. 6A shows the second filter 112 occupying substantially all of the width of the fuel reservoir 110, while FIG. 6B shows the second filter 112 occupying substantially all of the height of the fuel reservoir. While not all constructions include the second filter 112 shaped and sized in such a way, the illustrated constructions may provide for maintaining the second filter in place during operation.

Turning now to FIG. 6B, the first filter 111 is shown disposed in the fuel bowl chamber 34 between the base 50 of the fuel metering unit 42 and the bottom surface of the fuel bowl 30. The illustrated constructions shows the first filter 111 shaped and sized such that the first filter is trapped in place between the base 50 and the fuel bowl 30. A third filter 113 is shown disposed in the fuel supply passageway 40 between the fuel supply inlet 39 and the fuel supply outlet 41. In another construction including only the first filter 111 and the second filter 112, the first filter 111 can be located in the fuel supply passageway 40 in a similar manner to what is shown with regard to the third filter 113. The filters 111, 112, 113 may be fuel filters or other types of holding members that contain molecular sieves. The filters 111, 112, 113 remove harmful compounds in fuel and neutralize the chemical reaction that promotes fuel decay. The filters 111, 112, 113 also remove water bound to fuel to reduce corrosion and phase separation.

Figure 7:
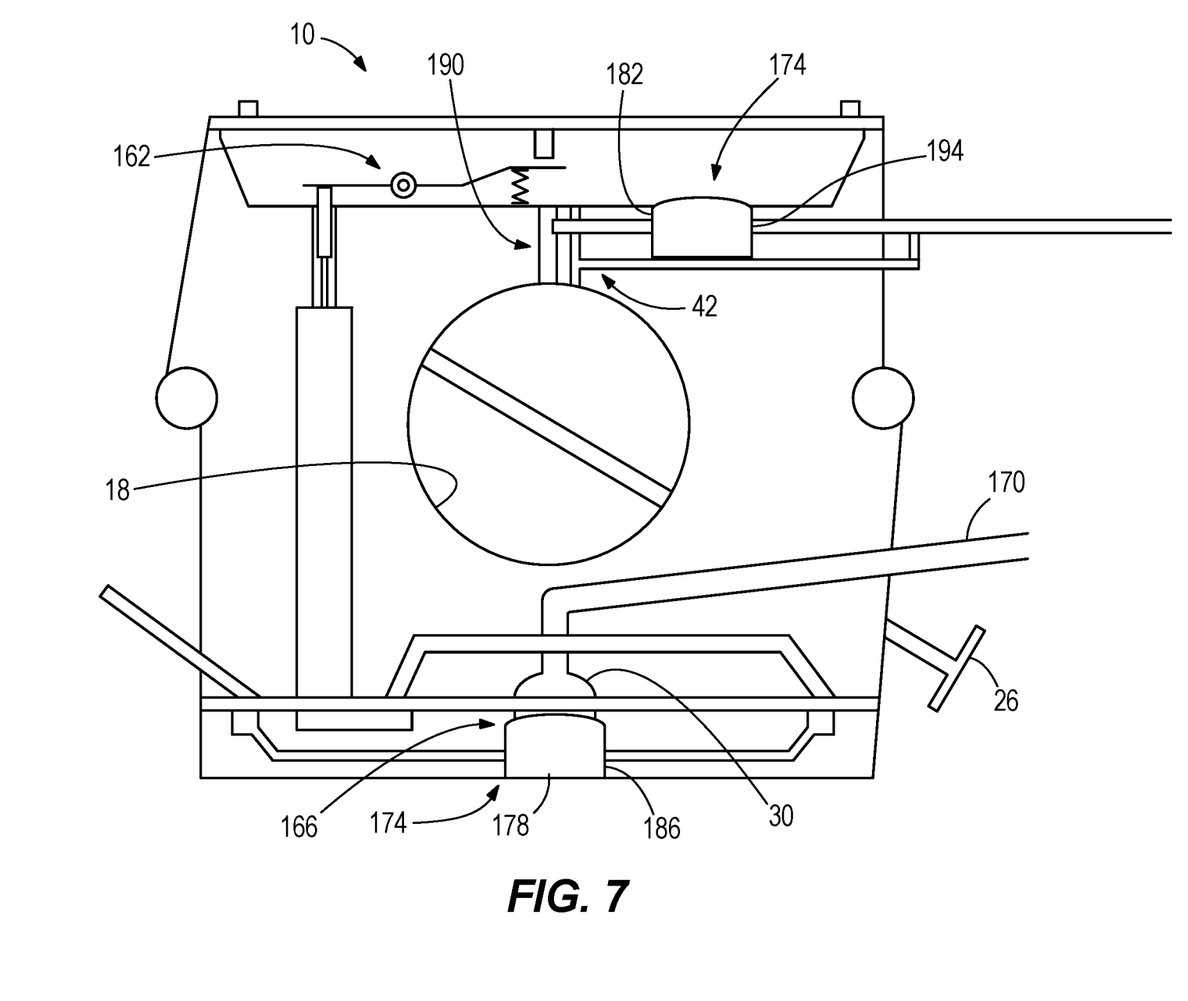
FIG. 7 is a schematic representation of the carburetor of FIG. 1.

With reference to FIG. 7, the carburetor 10 includes a metering side 162 and a fuel pump side 166. The metering side 162 includes the fuel metering unit 42, the fuel reservoir 110, and the jets 106, 126. During operation, the metering side 162 directs fuel from the fuel bowl 30 through the fuel metering unit 42 and into the air/fuel passageway 18. The fuel pump side 166 draws fuel from a gas tank (not shown) into the fuel bowl 30. The fuel pump side 166 includes the fuel bowl 30, a pump (not shown), and a fuel line 170. Fuel is transported from the gas tank to the fuel bowl 30 through the fuel line 170. In the illustrated embodiment, the pump draws the fuel from the fuel tank to the fuel bowl 30. In other embodiments, the fuel may be gravity fed from the gas tank to the fuel bowl 30 or pressure fed.

With continued reference to FIG. 7, the carburetor 10 includes two filters 174. In the illustrated construction, the filters 174 include a holding member, such as a mesh screen, that contains a molecular sieve. In other constructions, the filters 174 may be fuel filters or other types of holding members that contain molecular sieves. The filters 174 remove harmful compounds in fuel and neutralize the chemical reaction that promotes fuel decay. The filters 174 also remove water bound to fuel to reduce corrosion and phase separation. In further embodiments, the carburetor may include one more or fewer than two filters.

In the illustrated embodiment, the filters 174 are positioned in machined spaces within the carburetor 10. A first machined space 178 is positioned on the fuel pump side 166 and a second machined space 182 is positioned on the metering side 162. As seen in FIG. 7, the first machined space 178 is positioned within the fuel bowl 30 and contains a first molecular sieve 186. In other embodiments, the first machined space 178 may be positioned in other locations within the fuel pump side 166 such as the gas tank or the fuel line 170. The second machined space 182 is positioned within a throat 190 of the fuel metering unit 42 and contains a second molecular sieve 194. In other embodiments, the second machined space 182 may be positioned within the low throttle conduit 54, the high throttle conduit 58, the reservoir 110, or other positions within the metering side 162. In further embodiments, the first and second machined spaces 178, 182 of carburetor 10 may be omitted and the first and second molecular sieves 186, 194 may be positioned directly within the fuel bowl 30 or the throat 190.

The first and second molecular sieves 186, 194 are made from a material with pores (very small holes) of uniform size. These pore diameters are similar in size to small molecules, and thus large molecules cannot enter or be absorbed, while smaller molecules can. The molecular sieves stabilize fuel and remove water without the need for fuel additives. Further, the molecular sieves may treat fuel within the carburetor for 2-4 years without being replaced. In other embodiments, the carburetor may include fewer or more than two molecular sieves positioned within the carburetor.

During operation, fuel is drawn from the fuel tank through the fuel line 170 and into the fuel bowl 30 where it contacts the first molecular sieve 186. The first molecular sieve 186 filters the fuel a first time removing any water or harmful contaminants. The air/fuel passageway 18 creates an airflow that draws the fuel from fuel bowl 30 through the orifice 114 in the jet 106 and into the fuel reservoir 110. Fuel is subsequently drawn from the fuel reservoir 110 and through the fuel metering unit 42. Before the fuel is discharged from the fuel metering unit 42, the fuel contacts the second molecular sieve 194. The second molecular sieve 194 filters the fuel a second time removing any water or harmful contaminants. The fuel is then mixed with air within the passageways 62, 66 of the fuel metering unit 42. The resultant air/fuel mixture in the passageways 62, 64 is then discharged directly into the air/fuel passageway 18 for use by the engine.

Providing a carburetor with integrated filters advantageously assists in the overall operation of a small engine. The filters remove water and other contaminants from fuel as it is drawn into the engine preventing fuel degradation and reducing corrosion within the engine. Thus, the clean fuel assists in operating the engine, and more particularly starting the engine after an off season, when the engine is not operated for several months.

Various features and advantages of the disclosure are set forth in the following claims.

What is claimed is:

1. A carburetor comprising:
a body;
a fuel bowl coupled to the body;
a fuel bowl chamber defined by the body and the fuel bowl;
a fuel supply inlet;
a fuel supply passageway fluidly coupling the fuel supply inlet with the fuel bowl chamber;
a fuel metering unit coupled to the body;
a first filter disposed in one of the fuel supply passageway and the fuel bowl chamber;
a second filter disposed in the fuel metering unit; and
wherein at least one of the first filter and the second filter includes a molecular sieve.

2. The carburetor of claim 1, wherein each of the first filter and the second filter includes a molecular sieve.

3. The carburetor of claim 1, and further comprising
an air/fuel passageway defined in the body; and
wherein the fuel metering unit includes a first metering passageway to fluidly communicate the fuel bowl chamber with the air/fuel passageway.

4. The carburetor of claim 3, wherein the fuel metering unit further includes a second metering passageway to fluidly communicate the fuel bowl chamber with the air/fuel passageway.

5. The carburetor of claim 4, wherein the first metering passageway includes a high throttle fuel passageway, and the second metering passageway includes a low throttle fuel passageway.

6. The carburetor of claim 1, wherein the first filter is disposed in the fuel bowl chamber.

7. The carburetor of claim 6, further comprising a third filter disposed in the fuel supply passageway between the fuel supply inlet and the fuel bowl chamber.

8. The carburetor of claim 7, wherein each of the first filter, the second filter, and the third filter includes a molecular sieve.

9. The carburetor of claim 6, wherein
the body includes a stem extending into the fuel bowl chamber, and
the first filter surrounds the stem.

10. The carburetor of claim 1, wherein the first filter is disposed in the fuel supply passageway between the fuel supply inlet and the fuel bowl chamber.

11. The carburetor of claim 1, wherein the fuel metering unit further includes a fuel reservoir defined therein.

12. The carburetor of claim 11, wherein the second filter is disposed in the fuel reservoir.

13. A carburetor comprising:
a body;
a fuel bowl coupled to the body;
a fuel bowl chamber defined by the body and the fuel bowl;
a fuel supply inlet;
a fuel supply passageway fluidly coupling the fuel supply inlet with the fuel bowl chamber;
a fuel metering unit coupled to the body;
a first filter disposed in the fuel bowl chamber;
a second filter disposed in the fuel metering unit; and
wherein
the body includes a stem extending into the fuel bowl chamber,
the fuel metering unit is coupled to the stem, the fuel metering unit further including a base, and
the first filter is disposed between the base of the fuel metering unit and the fuel bowl.

14. The carburetor of claim 13, wherein the first filter is trapped in place between the base of the fuel metering unit and the fuel bowl.

* * * * *